US012784088B2

(12) United States Patent
Zhang et al.

(10) Patent No.: US 12,784,088 B2
(45) Date of Patent: Nov. 3, 2026

(54) CLASSIFYING AND ORGANIZING SEARCH RESULTS USING A MULTICLASS CLASSIFICATION MODEL

(71) Applicant: Maplebear Inc., San Francisco, CA (US)

(72) Inventors: Xuan Zhang, Palo Alto, CA (US); Max Comer, San Francisco, CA (US); Qi Zhong, Los Angeles, CA (US); Ji Chao Zhang, Richmond Hill (CA); Tejaswi Tenneti, San Carlos, CA (US); Haixun Wang, Bellevue, WA (US)

(73) Assignee: Maplebear Inc., San Francisco, CA (US)

( * ) Notice: Subject to any disclaimer, the term of this patent is extended or adjusted under 35 U.S.C. 154(b) by 358 days.

(21) Appl. No.: 18/545,213

(22) Filed: Dec. 19, 2023

(65) Prior Publication Data

US 2025/0200634 A1 Jun. 19, 2025

(51) Int. Cl.
*G06Q 30/00* (2023.01)
*G06Q 30/0601* (2023.01)

(52) U.S. Cl.
CPC ..... *G06Q 30/0631* (2013.01); *G06Q 30/0633* (2013.01); *G06Q 30/0643* (2013.01)

(58) Field of Classification Search
CPC ........... G06Q 30/0601; G06Q 30/0613; G06Q 30/0623; G06Q 30/0629; G06Q 30/0631
See application file for complete search history.

(56) References Cited

U.S. PATENT DOCUMENTS 7,987,188 B2 * 7/2011 Neylon ................. G06F 16/313 706/45
8,386,336 B1 * 2/2013 Fox .................... G06Q 30/0631 705/26.7
8,417,713 B1 * 4/2013 Blair-Goldensohn ....................... G06F 16/24578 705/347
2001/0021914 A1 * 9/2001 Jacobi .................... G06Q 30/02 705/26.1

(Continued)

OTHER PUBLICATIONS

Shen, Dou, et al. "Product query classification." Proceedings of the 18th ACM conference on information and knowledge management. 2009. (Year: 2009).*

(Continued)

*Primary Examiner* — Christopher B Seibert
(74) *Attorney, Agent, or Firm* — Fenwick & West LLP

(57) ABSTRACT

Classifying results of a user's search query using a trained classification model. In response to the search query, an online system retrieves a set of candidate search results, each candidate search result associated with a respective item of a plurality of items. The online system accesses the classification model that is trained to compute a probability of classification of each item into each class of a plurality of classes, each class associated with a type of relevance to the search query. The online system applies the classification model to generate, for each item, a classification score associated with each class. The online system classifies, based on the classification score, each item into a corresponding type of relevance to the search query. The online system selects, based on the classification of each item, a list of items for displaying at a user interface of a device associated with the user.

16 Claims, 5 Drawing Sheets

(56) References Cited

U.S. PATENT DOCUMENTS

| | | | | |
|---|---|---|---|---|
| 2005/0162670 | A1* | 7/2005 | Shuler | H04N 1/00408 358/1.2 |
| 2007/0046675 | A1* | 3/2007 | Iguchi | G06T 11/26 345/441 |
| 2009/0043660 | A1* | 2/2009 | Lee | G06Q 30/02 705/14.25 |
| 2009/0110089 | A1* | 4/2009 | Green | H04L 5/0037 370/329 |
| 2009/0125371 | A1* | 5/2009 | Neylon | G06F 16/313 707/739 |
| 2010/0268661 | A1* | 10/2010 | Levy | G06Q 30/02 705/347 |
| 2013/0065523 | A1* | 3/2013 | Yun | H04M 1/72412 455/41.1 |
| 2014/0195931 | A1* | 7/2014 | Kwon | G06Q 30/02 715/753 |
| 2014/0351079 | A1* | 11/2014 | Dong | G06Q 30/0282 705/26.7 |
| 2015/0379732 | A1* | 12/2015 | Sayre, III | G06Q 30/0623 382/164 |
| 2016/0162975 | A1* | 6/2016 | Chen | G06Q 30/0631 705/26.7 |
| 2017/0011015 | A1* | 1/2017 | Dakua | G06F 3/04842 |
| 2017/0193997 | A1* | 7/2017 | Chen | G06F 16/3329 |
| 2021/0004919 | A1* | 1/2021 | Lee | G06Q 50/184 |
| 2021/0141997 | A1* | 5/2021 | Pinnamaneni | G06F 40/106 |
| 2021/0157312 | A1* | 5/2021 | Cella | G01M 13/028 |
| 2021/0165849 | A1* | 6/2021 | Mohri | G06F 16/958 |
| 2022/0012296 | A1* | 1/2022 | Marey | G06N 3/045 |
| 2022/0058504 | A1* | 2/2022 | Malhotra | G06N 20/00 |
| 2022/0108262 | A1* | 4/2022 | Cella | G01N 29/14 |
| 2022/0237368 | A1* | 7/2022 | Tran | G06F 21/1015 |
| 2023/0021529 | A1* | 1/2023 | Bhattacherjee | G06F 16/33295 |
| 2023/0385765 | A1* | 11/2023 | Singh | G06Q 10/0875 |
| 2024/0330754 | A1* | 10/2024 | Unnikrishnan | G06Q 30/0283 |

OTHER PUBLICATIONS

Farid, Dewan Md, et al. "Hybrid decision tree and naïve Bayes classifiers for multi-class classification tasks." Expert systems with applications 41.4 (2014): 1937-1946. (Year: 2014).*

* cited by examiner

CLASSIFYING AND ORGANIZING SEARCH RESULTS USING A MULTICLASS CLASSIFICATION MODEL

BACKGROUND

Present-day online systems, such as online concierge systems, utilize machine-learning computer models to score content for their relevance to search queries and/or users of the online concierge systems. However, the traditional machine-learning models are not trained to evaluate different types of relevance to search queries and/or users that content may have. This limits the ability of a user interface to present useful content to a user of an online concierge system. Hence, there is a technical problem of improving the quality of ads and recommendations that sometimes traditional machine-learning models cannot provide. Therefore, there is a need for a new type of machine-learning model approach when providing ads and recommendations to users of the online concierge system based on search queries entered by the users.

SUMMARY

Embodiments of the present disclosure are directed to using a trained computer model to classify and organize results of a search query before providing recommendations to a user of an online system (e.g., online concierge system). In one or more embodiments, the trained computer model is a multiclass classification model that classifies the results of the search query into three or more classes. In other embodiments, the trained computer model classifies the results of a search query into two different classes.

In accordance with one or more aspects of the disclosure, the online system receives a search query from a device associated with a user of the online system. The online system retrieves a set of candidate search results in response to the search query, each candidate search result in the set of candidate search results associated with a respective item of a plurality of items. The online system accesses a classification computer model of the online system, wherein the classification computer model is trained to compute a probability of classification of each of the plurality of items into each class of a plurality of classes, each class associated with a type of relevance to the search query. The online system applies the classification computer model to generate, based at least in part on the search query and one or more features of each of the plurality of items, a classification score associated with each of the plurality of classes for each of the plurality of items. The classification score may represent (or be indicative of) the probability of classification of each of the plurality of items into each of the plurality of classes. The online system classifies, based on the classification score associated with each of the plurality of classes for each of the plurality of items, each of the plurality of items into a corresponding type of relevance to the search query of a plurality of relevance types. The online system selects, based at least in part on the classification of each of the plurality of items into the corresponding type of relevance, a list of items from the plurality of items. The online system causes a user interface of the device associated with the user to organize, according to the classification of each item in the list of items, the list of items for recommendation to the user and inclusion into a cart.

DETAILED DESCRIPTION

Figure 1:
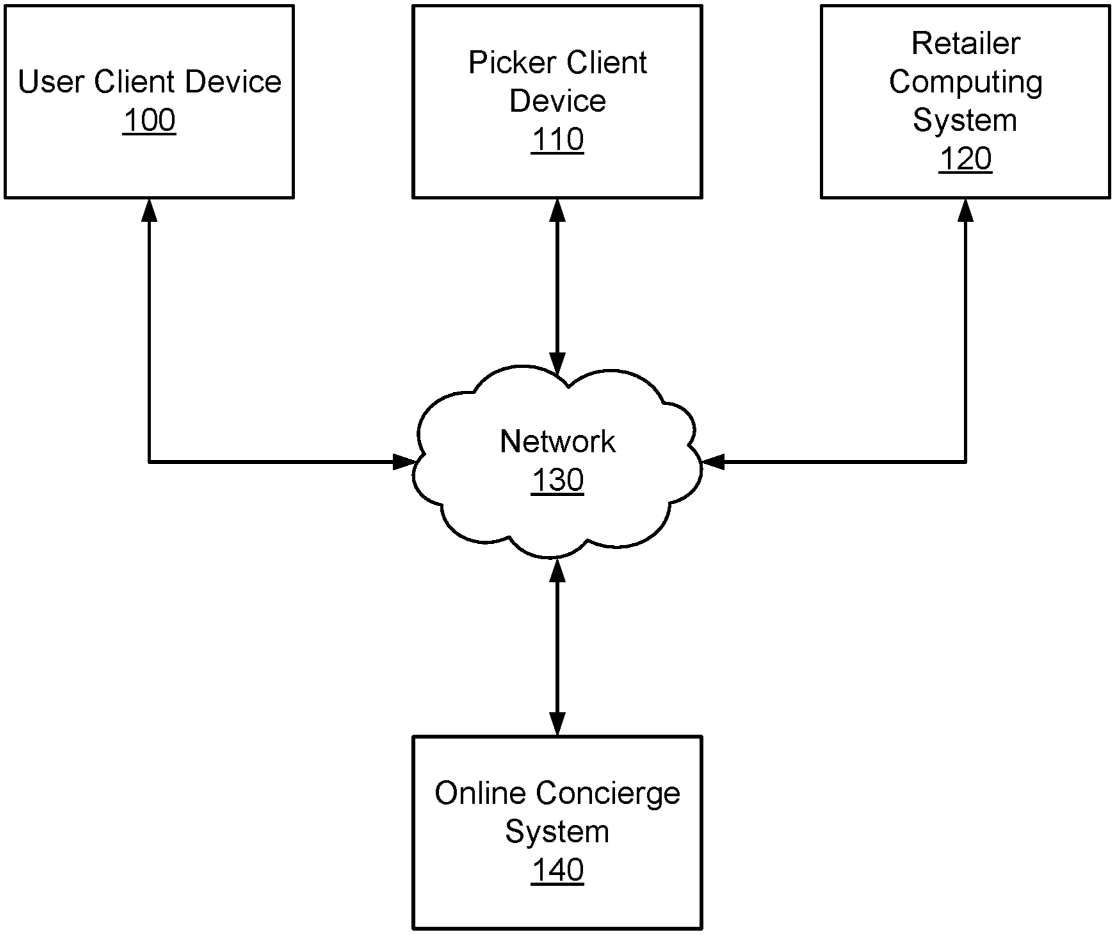
FIG. 1 illustrates an example system environment for an online concierge system, in accordance with one or more embodiments.

FIG. 1 illustrates an example system environment for an online concierge system 140, in accordance with one or more embodiments. The system environment illustrated in FIG. 1 includes a user client device 100, a picker client device 110, a retailer computing system 120, a network 130, and an online concierge system 140. Alternative embodiments may include more, fewer, or different components from those illustrated in FIG. 1, and the functionality of each component may be divided between the components differently from the description below. Additionally, each component may perform their respective functionalities in response to a request from a human, or automatically without human intervention.

Although one user client device 100, picker client device 110, and retailer computing system 120 are illustrated in FIG. 1, any number of users, pickers, and retailers may interact with the online concierge system 140. As such, there may be more than one user client device 100, picker client device 110, or retailer computing system 120.

The user client device 100 is a client device through which a user may interact with the picker client device 110, the retailer computing system 120, or the online concierge system 140. The user client device 100 can be a personal or mobile computing device, such as a smartphone, a tablet, a laptop computer, or desktop computer. In some embodiments, the user client device 100 executes a client application that uses an application programming interface (API) to communicate with the online concierge system 140.

A user uses the user client device 100 to place an order with the online concierge system 140. An order specifies a set of items to be delivered to the user. An "item," as used herein, means a good or product that can be provided to the user through the online concierge system 140. The order may include item identifiers (e.g., a stock keeping unit (SKU) or a price look-up (PLU) code) for items to be delivered to the user and may include quantities of the items to be delivered. Additionally, an order may further include a delivery location to which the ordered items are to be delivered and a timeframe during which the items should be delivered. In some embodiments, the order also specifies one or more retailers from which the ordered items should be collected.

The user client device 100 presents an ordering interface to the user. The ordering interface is a user interface that the user can use to place an order with the online concierge system 140. The ordering interface may be part of a client application operating on the user client device 100. The ordering interface allows the user to search for items that are available through the online concierge system 140 and the user can select which items to add to a "shopping list." A "shopping list," as used herein, is a tentative set of items that the user has selected for an order but that has not yet been finalized for an order. The ordering interface allows a user to update the shopping list, e.g., by changing the quantity of items, adding or removing items, or adding instructions for items that specify how the item should be collected.

The user client device 100 may receive additional content from the online concierge system 140 to present to a user. For example, the user client device 100 may receive coupons, recipes, or item suggestions. The user client device 100 may present the received additional content to the user as the user uses the user client device 100 to place an order (e.g., as part of the ordering interface).

Additionally, the user client device 100 includes a communication interface that allows the user to communicate with a picker that is servicing the user's order. This communication interface allows the user to input a text-based message to transmit to the picker client device 110 via the network 130. The picker client device 110 receives the message from the user client device 100 and presents the message to the picker. The picker client device 110 also includes a communication interface that allows the picker to communicate with the user. The picker client device 110 transmits a message provided by the picker to the user client device 100 via the network 130. In some embodiments, messages sent between the user client device 100 and the picker client device 110 are transmitted through the online concierge system 140. In addition to text messages, the communication interfaces of the user client device 100 and the picker client device 110 may allow the user and the picker to communicate through audio or video communications, such as a phone call, a voice-over-IP call, or a video call.

The picker client device 110 is a client device through which a picker may interact with the user client device 100, the retailer computing system 120, or the online concierge system 140. The picker client device 110 can be a personal or mobile computing device, such as a smartphone, a tablet, a laptop computer, or desktop computer. In some embodiments, the picker client device 110 executes a client application that uses an application programming interface (API) to communicate with the online concierge system 140.

The picker client device 110 receives orders from the online concierge system 140 for the picker to service. A picker services an order by collecting the items listed in the order from a retailer. The picker client device 110 presents the items that are included in the user's order to the picker in a collection interface. The collection interface is a user interface that provides information to the picker on which items to collect for a user's order and the quantities of the items. In some embodiments, the collection interface provides multiple orders from multiple users for the picker to service at the same time from the same retailer location. The collection interface further presents instructions that the user may have included related to the collection of items in the order. Additionally, the collection interface may present a location of each item at the retailer, and may even specify a sequence in which the picker should collect the items for improved efficiency in collecting items. In some embodiments, the picker client device 110 transmits to the online concierge system 140 or the user client device 100 which items the picker has collected in real time as the picker collects the items.

The picker can use the picker client device 110 to keep track of the items that the picker has collected to ensure that the picker collects all of the items for an order. The picker client device 110 may include a barcode scanner that can determine an item identifier encoded in a barcode coupled to an item. The picker client device 110 compares this item identifier to items in the order that the picker is servicing, and if the item identifier corresponds to an item in the order, the picker client device 110 identifies the item as collected. In some embodiments, rather than or in addition to using a barcode scanner, the picker client device 110 captures one or more images of the item and determines the item identifier for the item based on the images. The picker client device 110 may determine the item identifier directly or by transmitting the images to the online concierge system 140. Furthermore, the picker client device 110 determines a weight for items that are priced by weight. The picker client device 110 may prompt the picker to manually input the weight of an item or may communicate with a weighing system in the retailer location to receive the weight of an item.

When the picker has collected all of the items for an order, the picker client device 110 instructs a picker on where to deliver the items for a user's order. For example, the picker client device 110 displays a delivery location from the order to the picker. The picker client device 110 also provides navigation instructions for the picker to travel from the retailer location to the delivery location. When a picker is servicing more than one order, the picker client device 110 identifies which items should be delivered to which delivery location. The picker client device 110 may provide navigation instructions from the retailer location to each of the delivery locations. The picker client device 110 may receive one or more delivery locations from the online concierge system 140 and may provide the delivery locations to the picker so that the picker can deliver the corresponding one or more orders to those locations. The picker client device 110 may also provide navigation instructions for the picker from the retailer location from which the picker collected the items to the one or more delivery locations.

In some embodiments, the picker client device 110 tracks the location of the picker as the picker delivers orders to delivery locations. The picker client device 110 collects location data and transmits the location data to the online concierge system 140. The online concierge system 140 may transmit the location data to the user client device 100 for display to the user, so that the user can keep track of when their order will be delivered. Additionally, the online concierge system 140 may generate updated navigation instructions for the picker based on the picker's location. For example, if the picker takes a wrong turn while traveling to a delivery location, the online concierge system 140 determines the picker's updated location based on location data from the picker client device 110 and generates updated navigation instructions for the picker based on the updated location.

In one or more embodiments, the picker is a single person who collects items for an order from a retailer location and delivers the order to the delivery location for the order. Alternatively, more than one person may serve the role as a picker for an order. For example, multiple people may collect the items at the retailer location for a single order. Similarly, the person who delivers an order to its delivery location may be different from the person or people who collected the items from the retailer location. In these embodiments, each person may have a picker client device 110 that they can use to interact with the online concierge system 140.

Additionally, while the description herein may primarily refer to pickers as humans, in some embodiments, some or all of the steps taken by the picker may be automated. For example, a semi- or fully-autonomous robot may collect items in a retailer location for an order and an autonomous vehicle may deliver an order to a user from a retailer location.

The retailer computing system 120 is a computing system operated by a retailer that interacts with the online concierge system 140. As used herein, a "retailer" is an entity that operates a "retailer location," which is a store, warehouse, or other building from which a picker can collect items. The retailer computing system 120 stores and provides item data to the online concierge system 140 and may regularly update the online concierge system 140 with updated item data. For example, the retailer computing system 120 provides item data indicating which items are available at a particular retailer location and the quantities of those items. Additionally, the retailer computing system 120 may transmit updated item data to the online concierge system 140 when an item is no longer available at the retailer location. Additionally, the retailer computing system 120 may provide the online concierge system 140 with updated item prices, sales, or availabilities. Additionally, the retailer computing system 120 may receive payment information from the online concierge system 140 for orders serviced by the online concierge system 140. Alternatively, the retailer computing system 120 may provide payment to the online concierge system 140 for some portion of the overall cost of a user's order (e.g., as a commission).

The user client device 100, the picker client device 110, the retailer computing system 120, and the online concierge system 140 can communicate with each other via the network 130. The network 130 is a collection of computing devices that communicate via wired or wireless connections. The network 130 may include one or more local area networks (LANs) or one or more wide area networks (WANs). The network 130, as referred to herein, is an inclusive term that may refer to any or all of standard layers used to describe a physical or virtual network, such as the physical layer, the data link layer, the network layer, the transport layer, the session layer, the presentation layer, and the application layer. The network 130 may include physical media for communicating data from one computing device to another computing device, such as multiprotocol label switching (MPLS) lines, fiber optic cables, cellular connections (e.g., 3G, 4G, or 5G spectra), or satellites. The network 130 also may use networking protocols, such as TCP/IP, HTTP, SSH, SMS, or FTP, to transmit data between computing devices. In some embodiments, the network 130 may include Bluetooth or near-field communication (NFC) technologies or protocols for local communications between computing devices. The network 130 may transmit encrypted or unencrypted data.

The online concierge system 140 is an online system by which users can order items to be provided to them by a picker from a retailer. The online concierge system 140 receives orders from the user client device 100 through the network 130. The online concierge system 140 selects a picker to service the user's order and transmits the order to the picker client device 110 associated with the picker. The picker collects the ordered items from a retailer location and delivers the ordered items to the user. The online concierge system 140 may charge a user for the order and provide portions of the payment from the user to the picker and the retailer.

As an example, the online concierge system 140 may allow a user to order groceries from a grocery store retailer. The user's order may specify which groceries they want delivered from the grocery store and the quantities of each of the groceries. The user client device 100 transmits the user's order to the online concierge system 140 and the online concierge system 140 selects a picker to travel to the grocery store retailer location to collect the groceries ordered by the user. Once the picker has collected the groceries ordered by the user, the picker delivers the groceries to a location transmitted to the picker client device 110 by the online concierge system 140.

The online concierge system 140 provides a search interface that receives a search query entered by a user of the online concierge system 140 (e.g., via the user client device 100). In response to the received search query, the online concierge system 140 retrieves a set of one or more items (or candidate search results) maintained in a database of the online concierge system 140. To improve the search results provided to the user, in addition to ranking the search results (e.g., using an engagement prediction computer model), the online concierge system 140 applies a novel classification computer model (e.g., machine-learning computer model) trained to classify each retrieved candidate search result based on a type of relevance to the search query. Possible types of relevance to the search query can be, e.g., Exact Match, Strong Substitute, Weak Substitute, Close Complement, Remote Complement, Irrelevant, and Offensive. The online concierge system 140 may then group the search results in a user interface of the user client device 100 according to the predicted type of relevance. The online concierge system 140 may further rank the search results within each relevance group using the scores generated by, e.g., the engagement prediction computer model.

In general, the online concierge system 140 classifies content obtained in response to a user's search query under several different types of relevance to the search query (or classes), such as Exact Match, Strong Substitute, Weak Substitute, Close Complement, Remote Complement, Irrelevant, and Offensive. The online concierge system 140 then applies certain rules to present content grouped into the classes at a user interface of the user client device 100. The online concierge system 140 utilizes a granularized query-item evaluation framework for improving the capacity for more precisely assessing user's perceptions regarding the relevance of recommended items, with the aim of achieving broader and more relevant advertisement coverage and optimizing search results. The granularized query-item evaluation framework presented herein is based upon issues identified from observations and evaluations of the user's relevance for different items, as well as from analysis of the uniqueness in relationship between a search query and item recommendations. The online concierge system 140 is described in further detail below with regards to FIG. 2.

Figure 2:
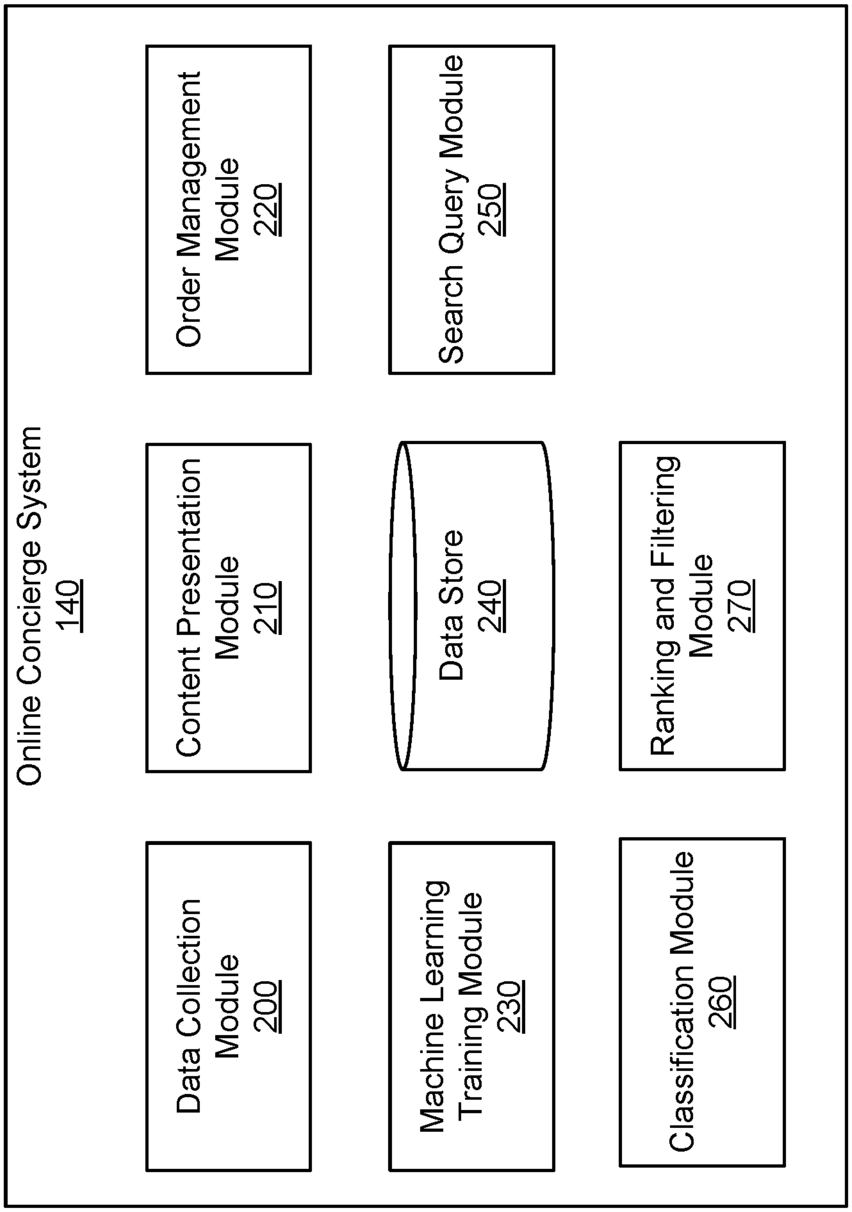
FIG. 2 illustrates an example system architecture for an online concierge system, in accordance with one or more embodiments.

FIG. 2 illustrates an example system architecture for the online concierge system 140, in accordance with some embodiments. The system architecture illustrated in FIG. 2 includes a data collection module 200, a content presentation module 210, an order management module 220, a machine-learning training module 230, a data store 240, a search query module 250, a classification module 260, and a ranking and filtering module 270. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The data collection module 200 collects data used by the online concierge system 140 and stores the data in the data store 240. The data collection module 200 may only collect data describing a user if the user has previously explicitly consented to the online concierge system 140 collecting data describing the user. Additionally, the data collection module 200 may encrypt all data, including sensitive or personal data, describing users.

For example, the data collection module 200 collects user data, which is information or data that describe characteristics of a user. For example, the data collection module 200 may collect the user data that include a user's name, address, shopping preferences, favorite items, or stored payment instruments. The data collection module 200 may collect the user data that also include default settings established by the user, such as a default retailer/retailer location, payment instrument, delivery location, or delivery timeframe. The data collection module 200 may collect the user data from sensors on the user client device 100 or based on the user's interactions with the online concierge system 140.

The data collection module 200 also collects item data, which is information or data that identifies and describes items that are available at a retailer location. The data collection module 200 may collect the item data that include item identifiers for items that are available and may include quantities of items associated with each item identifier. Additionally, the data collection module 200 may collect the item data that also include attributes of items such as the size, color, weight, stock keeping unit (SKU), or serial number for the item. The data collection module 200 may collect the item data that further include purchasing rules associated with each item, if they exist. For example, age-restricted items such as alcohol and tobacco are flagged accordingly in the item data. The data collection module 200 may collect the item data that also include information that is useful for predicting the availability of items in retailer locations. For example, the data collection module 200 may collect the item data that include, for each item-retailer combination (a particular item at a particular warehouse), a time that the item was last found, a time that the item was last not found (a picker looked for the item but could not find it), the rate at which the item is found, or the popularity of the item. The data collection module 200 may collect the item data from the retailer computing system 120, the picker client device 110, or the user client device 100.

An item category is a set of items that are a similar type of item. Items in an item category may be considered to be equivalent to each other or that may be replacements for each other in an order. For example, different brands of sourdough bread may be different items, but these items may be in a "sourdough bread" item category. The item categories may be human-generated and human-populated with items. The item categories also may be generated automatically by the online concierge system 140 (e.g., using a clustering algorithm).

The data collection module 200 also collects picker data, which is information or data that describes characteristics of pickers. For example, the data collection module 200 may collect the picker data for a picker that include the picker's name, the picker's location, how often the picker has serviced orders for the online concierge system 140, a user rating for the picker, which retailers the picker has collected items at, or the picker's previous shopping history. Additionally, the data collection module 200 may collect the picker data that include preferences expressed by the picker, such as their preferred retailers to collect items at, how far they are willing to travel to deliver items to a user, how many items they are willing to collect at a time, timeframes within which the picker is willing to service orders, or payment information by which the picker is to be paid for servicing orders (e.g., a bank account). The data collection module 200 collects the picker data from sensors of the picker client device 110 or from the picker's interactions with the online concierge system 140.

Additionally, the data collection module 200 collects order data, which is information or data that describes characteristics of an order. For example, the data collection module 200 may collect the order data that include item data for items that are included in the order, a delivery location for the order, a user associated with the order, a retailer location from which the user wants the ordered items collected, or a timeframe within which the user wants the order delivered. Also, the data collection module 200 may collect the order data that further include information describing how the order was serviced, such as which picker serviced the order, when the order was delivered, or a rating that the user gave the delivery of the order. In some embodiments, the data collection module 200 collects the order data that include user data for users associated with the order, such as user data for a user who placed the order or picker data for a picker who serviced the order.

The content presentation module 210 selects content for presentation to a user. For example, the content presentation module 210 selects which items to present to a user while the user is placing an order. The content presentation module 210 generates and transmits an ordering interface for the user to order items. The content presentation module 210 populates the ordering interface with items that the user may select for adding to their order. In some embodiments, the content presentation module 210 presents a catalog of all items that are available to the user, which the user can browse to select items to order. The content presentation module 210 also may identify items that the user is most likely to order and present those items to the user. For example, the content presentation module 210 may score items and rank the items based on their scores. The content presentation module 210 displays the items with scores that exceed some threshold (e.g., the top n items or the p percentile of items).

The content presentation module 210 may use an item selection model to score items for presentation to a user. An item selection model is a machine-learning model that is trained to score items for a user based on item data for the items and user data for the user. For example, the item selection model may be trained to determine a likelihood that the user will order the item. In some embodiments, the item selection model uses item embeddings describing items and user embeddings describing users to score items. These item embeddings and user embeddings may be generated by separate machine-learning models and may be stored in the data store 240.

In some embodiments, the content presentation module 210 scores items based on a search query received from the user client device 100. A search query is free text for a word or set of words that indicate items of interest to the user. The content presentation module 210 scores items based on a relatedness of the items to the search query. For example, the content presentation module 210 may apply natural language processing (NLP) techniques to the text in the search query to generate a search query representation (e.g., an embedding) that represents characteristics of the search query. The content presentation module 210 may use the search query representation to score candidate items for presentation to a user (e.g., by comparing a search query embedding to an item embedding).

In some embodiments, the content presentation module 210 scores items based on a predicted availability of an item. The content presentation module 210 may use an availability model to predict the availability of an item. An availability model is a machine-learning model that is trained to predict the availability of an item at a particular retailer location. For example, the availability model may be trained to predict a likelihood that an item is available at a retailer location or may predict an estimated number of items that are available at a retailer location. The content presentation module 210 may apply a weight to the score for an item based on the predicted availability of the item. Alternatively, the content presentation module 210 may filter out items from presentation to a user based on whether the predicted availability of the item exceeds a threshold.

The order management module 220 manages orders for items from users. The order management module 220 receives orders from the user client device 100 and assigns the orders to pickers for service based on picker data. For example, the order management module 220 assigns an order to a picker based on the picker's location and the location of the retailer from which the ordered items are to be collected. The order management module 220 may also assign an order to a picker based on how many items are in the order, a vehicle operated by the picker, the delivery location, the picker's preferences on how far to travel to deliver an order, the picker's ratings by users, or how often a picker agrees to service an order.

In some embodiments, the order management module 220 determines when to assign an order to a picker based on a delivery timeframe requested by the user with the order. The order management module 220 computes an estimated amount of time that it would take for a picker to collect the items for an order and deliver the ordered items to the delivery location for the order. The order management module 220 assigns the order to a picker at a time such that, if the picker immediately services the order, the picker is likely to deliver the order at a time within the requested timeframe. Thus, when the order management module 220 receives an order, the order management module 220 may delay in assigning the order to a picker if the requested timeframe is far enough in the future (i.e., the picker may be assigned at a later time and is still predicted to meet the requested timeframe).

When the order management module 220 assigns an order to a picker, the order management module 220 transmits the order to the picker client device 110 associated with the picker. The order management module 220 may also transmit navigation instructions from the picker's current location to the retailer location associated with the order. If the order includes items to collect from multiple retailer locations, the order management module 220 identifies the retailer locations to the picker and may also specify a sequence in which the picker should visit the retailer locations.

The order management module 220 may track the location of the picker through the picker client device 110 to determine when the picker arrives at the retailer location. When the picker arrives at the retailer location, the order management module 220 transmits the order to the picker client device 110 for display to the picker. As the picker uses the picker client device 110 to collect items at the retailer location, the order management module 220 receives item identifiers for items that the picker has collected for the order. In some embodiments, the order management module 220 receives images of items from the picker client device 110 and applies computer-vision techniques to the images to identify the items depicted by the images. The order management module 220 may track the progress of the picker as the picker collects items for an order and may transmit progress updates to the user client device 100 that describe which items have been collected for the user's order.

In some embodiments, the order management module 220 tracks the location of the picker within the retailer location. The order management module 220 uses sensor data from the picker client device 110 or from sensors in the retailer location to determine the location of the picker in the retailer location. The order management module 220 may transmit, to the picker client device 110, instructions to display a map of the retailer location indicating where in the retailer location the picker is located. Additionally, the order management module 220 may instruct the picker client device 110 to display the locations of items for the picker to collect, and may further display navigation instructions for how the picker can travel from their current location to the location of a next item to collect for an order.

The order management module 220 determines when the picker has collected all of the items for an order. For example, the order management module 220 may receive a message from the picker client device 110 indicating that all of the items for an order have been collected. Alternatively, the order management module 220 may receive item identifiers for items collected by the picker and determine when all of the items in an order have been collected. When the order management module 220 determines that the picker has completed an order, the order management module 220 transmits the delivery location for the order to the picker client device 110. The order management module 220 may also transmit navigation instructions to the picker client device 110 that specify how to travel from the retailer location to the delivery location, or to a subsequent retailer location for further item collection. The order management module 220 tracks the location of the picker as the picker travels to the delivery location for an order, and updates the user with the location of the picker so that the user can track the progress of the order. In some embodiments, the order management module 220 computes an estimated time of arrival of the picker at the delivery location and provides the estimated time of arrival to the user.

In some embodiments, the order management module 220 facilitates communication between the user client device 100 and the picker client device 110. As noted above, a user may use the user client device 100 to send a message to the picker client device 110. The order management module 220 receives the message from the user client device 100 and transmits the message to the picker client device 110 for presentation to the picker. The picker may use the picker client device 110 to send a message to the user client device 100 in a similar manner.

The order management module 220 coordinates payment by the user for the order. The order management module 220 uses payment information provided by the user (e.g., a credit card number or a bank account) to receive payment for the order. In some embodiments, the order management module 220 stores the payment information for use in subsequent orders by the user. The order management module 220 computes a total cost for the order and charges the user that cost. The order management module 220 may provide a portion of the total cost to the picker for servicing the order, and another portion of the total cost to the retailer.

The machine-learning training module 230 trains machine-learning models used by the online concierge system 140. The online concierge system 140 may use machine-learning models to perform functionalities described herein. Example machine-learning models include regression models, support vector machines, naïve bayes, decision trees, k nearest neighbors, random forest, boosting algorithms, k-means, and hierarchical clustering. The machine-learning models may also include neural networks, such as perceptrons, multilayer perceptrons, convolutional neural networks, recurrent neural networks, sequence-to-sequence models, generative adversarial networks, or transformers. A machine-learning model may include components relating to these different general categories of model, which may be sequenced, layered, or otherwise combined in various configurations. While the term "machine-learning model" may be broadly used herein to refer to any kind of machine-learning model, the term is generally limited to those types of models that are suitable for performing the described functionality. For example, certain types of machine-learning models can perform a particular functionality based on the intended inputs to, and outputs from, the model, the capabilities of the system on which the machine-learning model will operate, or the type and availability of training data for the model.

Each machine-learning model includes a set of parameters. The set of parameters for a machine-learning model are parameters that the machine-learning model uses to process an input to generate an output. For example, a set of parameters for a linear regression model may include weights that are applied to each input variable in the linear combination that comprises the linear regression model. Similarly, the set of parameters for a neural network may include weights and biases that are applied at each neuron in the neural network. The machine-learning training module 230 generates the set of parameters (e.g., the particular values of the parameters) for a machine-learning model by "training" the machine-learning model. Once trained, the machine-learning model uses the set of parameters to transform inputs into outputs.

The machine-learning training module 230 trains a machine-learning model based on a set of training examples. Each training example includes input data to which the machine-learning model is applied to generate an output. For example, each training example may include user data, picker data, item data, or order data. In some cases, the training examples also include a label which represents an expected output of the machine-learning model. In these cases, the machine-learning model is trained by comparing its output from input data of a training example to the label for the training example. In general, during training with labeled data, the set of parameters of the model may be set or adjusted to reduce a difference between the output for the training example (given the current parameters of the model) and the label for the training example.

The machine-learning training module 230 may apply an iterative process to train a machine-learning model whereby the machine-learning training module 230 updates parameter values of the machine-learning model based on each of the set of training examples. The training examples may be processed together, individually, or in batches. To train a machine-learning model based on a training example, the machine-learning training module 230 applies the machine-learning model to the input data in the training example to generate an output based on a current set of parameter values. The machine-learning training module 230 scores the output from the machine-learning model using a loss function. A loss function is a function that generates a score for the output of the machine-learning model such that the score is higher when the machine-learning model performs poorly and lower when the machine-learning model performs well. In cases where the training example includes a label, the loss function is also based on the label for the training example. Some example loss functions include the mean square error function, the mean absolute error, hinge loss function, and the cross entropy loss function. The machine-learning training module 230 updates the set of parameters for the machine-learning model based on the score generated by the loss function. For example, the machine-learning training module 230 may apply gradient descent to update the set of parameters.

In one or more embodiments, the machine-learning training module 230 may re-train the machine-learning model based on the actual performance of the model after the online concierge system 140 has deployed the model to provide service to users. For example, if the machine-learning model is used to predict a likelihood of an outcome of an event, the online concierge system 140 may log the prediction and an observation of the actual outcome of the event. Alternatively, if the machine-learning model is used to classify an object, the online concierge system 140 may log the classification as well as a label indicating a correct classification of the object (e.g., following a human labeler or other inferred indication of the correct classification). After sufficient additional training data has been acquired, the machine-learning training module 230 re-trains the machine-learning model using the additional training data, using any of the methods described above. This deployment and re-training process may be repeated over the lifetime use for the machine-learning model. This way, the machine-learning model continues to improve its output and adapts to changes in the system environment, thereby improving the functionality of the online concierge system 140 as a whole in its performance of the tasks described herein.

The data store 240 stores data used by the online concierge system 140. For example, the data store 240 stores user data, item data, order data, and picker data for use by the online concierge system 140. The data store 240 also stores trained machine-learning models trained by the machine-learning training module 230. For example, the data store 240 may store the set of parameters for a trained machine-learning model on one or more non-transitory, computer-readable media. The data store 240 uses computer-readable media to store data, and may use databases to organize the stored data.

The search query module 250 may receive a search query entered by a user of the online concierge system 140 via a search interface of the user client device 100. In response to the received search query, the search query module 250 may retrieve (e.g., from the data store 240) a set of candidate search results. Each candidate search result retrieved by the search query module 250 may be associated with one specific item from the data store 240. Information about a set of specific items retrieved by the search query module 250 may be provided to the classification module 260.

The classification module 260 may access a classification computer model (e.g., machine-learning computer model) that is trained to compute a probability of classification of each item retrieved by the search query module 250 into a respective class of a plurality of classes. Each class may be associated with a specific type of relevance to the search query, e.g., Exact Match, Strong Substitute, Weak Substitute, Close Complement, Remote Complement, Irrelevant, and Offensive. Thus, the classification computer model is trained to operate as a multiclass classification model. The classification module 260 may deploy the classification computer model to run a machine-learning algorithm to generate, based at least in part on the received search query and one or more features of each retrieved item, a classification score associated with each class for each retrieved item. The classification score associated with each class for each retrieved item may represent (or be interpreted as) a probability of each retrieved item belonging to each class. The classification module 260 may then classify, based on the classification score associated with each class for each retrieved item, each retrieved item into a corresponding type of relevance to the search query (e.g., into one of Exact Match class, Strong Substitute class, Weak Substitute class, Close Complement class, Remote Complement class, Irrelevant class, and Offensive class). A set of parameters for the classification computer model may be stored at one or more non-transitory computer-readable media of the classification module 260. Alternatively, the set of parameters for the classification computer model may be stored at one or more non-transitory computer-readable media of the data store 240.

The classification module 260 may feed inputs to the classification computer model, i.e., the search query and information about each retrieved item, such as a name of the retrieved item, brand of the retrieved item, type of the retrieved item, etc. Based on the inputs, the classification computer model may compute a classification score for each class in a set of classes for each retrieved item. The set of classes may include, e.g., Exact Match class, Strong Substitute class, Weak Substitute class, Close Complement class, Remote Complement class, Irrelevant class, and Offensive class. Hence, there is one class for each type of relevance to the search query.

The classification computer model may be a multi-class model that includes a two-tower sentence transformer encoder trained to generate embeddings for a search query and text data related to a retrieved item. The two-tower sentence transformer encoder may include a "query tower" associated with the search query and an "item tower" associated with the retrieved item. The two-tower sentence transformer encoder of the classification computer model may generate, based the search query and the one or more features of the retrieved item, a query embedding related to the search query (e.g., output by the "query tower") and an item embedding related to the retrieved item (e.g., output by the "item tower").

The classification computer model may further include a multilayer perceptron neural network head. The multilayer perceptron neural network head receives the query embedding and the item embedding and generates a set of classification outputs for the retrieved item, where each classification output is associated with a respective class in the set of classes. The classification computer model may compute (e.g., via the multilayer perceptron neural network head) a probability of classification of the retrieved item into each class by applying a predetermined function (e.g., SoftMax function) to the generated classification outputs. In such a manner, it is satisfied that a sum of probabilities of classification of the retrieved item into the set of classes is equal to 1. The probability of classification of the retrieved item into each class may represent the classification score associated with each class for the retrieved item, which is a final output of the classification computer model. This process is repeated (or performed in parallel) for each item retrieved by the search query module 250.

The classification computer model thus allows feeding in the search query and item-related text pairs and generates a probability score (i.e., classification score) for each class in the set of classes for each retrieved item indicating how likely the query-item pair is to represent each class. For example, the classification computer model may generate the probability score (i.e., classification score) of 0.7 for classifying a retrieved item into the Strong Substitute class, the probability score of 0.2 for classifying the retrieved item into the Exact Match class, the probability score of 0.1 to for classifying the retrieved item into the Weak Substitute class, and the probability scores of 0 to all remaining classes in the set of classes. Thus, in this example, the classification computer model assesses that the retrieved item is most likely a Strong Substitute for an item intended by the search query.

In general, the classification computer model outputs a classification score for each class in the set of classes. After that, the classification module 260 may apply a set of rules to convert the classification scores into class categorization to determine which class (or relevance type) is assigned to each retrieved item (i.e., search result). In one or more embodiments, the classification module 260 selects a class with the highest classification score and classifies the retrieved item into the selected class that has the highest classification score. In one or more other embodiments, the classification module 260 applies a threshold such that if none of the classes have a sufficiently high classification score, or if multiple classes have classification scores above the threshold or are too close together, then the classification is indeterminate.

The ranking and filtering module 270 may receive information about the classification of each retrieved item from the classification computer model and apply a number of different relevance filters (or checks) to ensure relevant searches and complementary ads are shown to the user, while irrelevant ads are filtered out. The ranking and filtering module 270 may select, based at least in part on the classification of each retrieved item into the corresponding type of relevance (or class), one or more items for recommendation to the user. The ranking and filtering module 270 may set thresholds on the classification scores for the set of retrieved items to allow recommendation of only those retrieved items that are relevant to the search query in a particular manner. In one or more embodiments, the thresholds are sets such that the ranking and filtering module 270 only selects retrieved items classified as the Exact Match and the Strong Substitute for recommendation and displaying to the user. In one or more other embodiments, the thresholds are sets such that the ranking and filtering module 270 selects retrieved items classified as the Exact Match, the Strong Substitute, Weak Substitute and Close Complement for recommendation and displaying to the user. In general, the ranking and filtering module 270 may filter out a subset of the retrieved items that were classified into a defined subset of relevance types. Only a remaining subset of the retrieved items that were not filtered out would be recommended and displayed to the user.

In one or more embodiments, the ranking and filtering module 270 selects the one or more items for recommendation based on a combined classification score for a defined subset of classes (e.g., Exact Match, the Strong Substitute, Weak Substitute and Close Complement) for each retried item being higher than a threshold score. The ranking and filtering module 270 may compute the combined classification score as a sum of classification scores associated with the defined subset of classes. The threshold score may be calibrated (e.g., via the ranking and filtering module 270) so that there is a sufficiently high likelihood (e.g., higher than a threshold likelihood) that the selected one or more items are relevant to the search query and create a positive experience for the user.

The ranking and filtering module 270 may further apply defined rules to the predicted classification of items to arrange the items in a user interface of the user client device 100. After filtering out the subset of retrieved items, the ranking and filtering module 270 may rank each remaining item based on their corresponding type of relevance to the search query. After that, the ranking and filtering module 270 may determine, based at least in part on the ranking, a displaying order for each of the remaining items. For example, one or more items classified within the Exact Match class (or type of relevance) would be displayed at the top of the user interface, one or more other items classified as the Strong Substitute class would be displayed immediately after the Exact Match class items, the one or more Strong Substitute class items would be followed by, e.g., one or more Weak Substitute class items, one or more Close Complement class items, and one or more Remote Complement class items. The ranking and filtering module 270 may filter out one or more items classified as the Irrelevant and Offensive.

In one or more embodiments, the ranking and filtering module 270 arranges, in the user interface, all items of one relevance type in its own area of the user interface (e.g., horizontally scrolling carousel). The ranking and filtering module 270 may further label a specific relevance type area of the user interface to explain the relevance category. For example, area(s) of the user interface that display items classified as the Weak Substitute and/or the Close Complement can be labeled as e.g., "More to Explore." Within each area of the user interface dedicated to a specific relevance type, items that belong to the same relevance type may be ranked and ordered according to an engagement prediction computer model of the online concierge system 140.

The ranking and filtering module 270 may access the engagement prediction computer model (e.g., machine-learning computer model) that is trained to compute a probability of engagement by the user for each item in a set of items that belong to the same relevance type. Engagement for an item may be e.g., viewing an item by the user, conversion of an item by the user, some other type of user's engagement in relation to an item, or some combination thereof. The probability of engagement may correspond to a probability of viewing an item by the user. Alternatively, the probability of engagement may correspond to a probability of conversion of an item by the user. The ranking and filtering module 270 may deploy the engagement prediction computer model to run a machine-learning algorithm to generate, based on information about engagement of the user in relation to each item from the set of items, a ranking score for each item in the set of items. The ranking and filtering module 270 may determine, based on the ranking score for each item in the set of items, a displaying order for the set of items that belong to the same type of relevance. A set of parameters for the engagement prediction computer model may be stored at one or more non-transitory computer-readable media of the ranking and filtering module 270. Alternatively, the set of parameters for the engagement prediction computer model may be stored at one or more non-transitory computer-readable media of the data store 240.

The content presentation module 210 may obtain (e.g., from the ranking and filtering module 270) an ordered list of items for recommendation to the user. The content presentation module 210 may cause the user client device 100 to display a user interface with the list of items in the determined order. The user may be then allowed to add any of the displayed items to a shopping cart. Information about the user's response to the displayed items (engagement information such as viewing information and/or conversion information) may be used for updating (e.g., via the machine-learning training module 230) the set of parameters of the classification computer model and/or the set of parameters of the engagement prediction computer model.

In one or more embodiments, the machine-learning training module 230 performs initial training of the classification computer model. The machine-learning training module 230 (or some other module of the online concierge system 140) may generate training data that include pairs of a search query text and a product description text obtained from engagement data (e.g., impression data and/or conversion data) associated with a collection of users of the online concierge system 140. The machine-learning training module 230 may use the generated training data to train the classification computer model. Alternatively or additionally, the machine-learning training module 230 may obtain data (e.g., from the data store 240) that include pairs of search queries from a collection of users and items retrieved in response to the search queries. The machine-learning training module 230 may generate evaluation training data based on evaluation of the pairs of search queries and items by a group of human raters (e.g., users of the online concierge system 140) in accordance with the aforementioned multi-class framework. The group of human raters may provide labels for each class in the set of classes given an item-query pair (or a user-item pair). The machine-learning training module 230 may train the classification computer model using the generated evaluation training data.

In one or more embodiments, the machine-learning training module 230 may re-train (or, more generally, update) the two-tower sentence transformer encoder of the classification computer model using positive and negative samples of conversions of classified items recommended to a user of the online concierge system 140. In such a manner, embeddings of a search query and retrieved items generated by the two-tower sentence transformer encoder may be more domain specific. Additionally, the machine-learning training module 230 may re-train the multilayer perceptron neural network head of the classification computer model based on the human-labeled search query/retrieved item pair examples. For example, users of the online concierge system 140 can cancel a classified recommended item from a user interface or otherwise provide negative feedback about a classification of the recommended item. The machine-learning training module 230 may also infer positive signals (i.e., labels) from users' clicks in relation to classified recommended items (i.e., viewing of classified recommended items) and/or users' conversions of the classified recommended items. Based on the collected labels (i.e., feedback data from the users), the machine-learning training module 230 may re-train and improve over time the entire classification computer model. As more human rated data are collected over time, the machine-learning training module 230 may re-train the classification computer model on a periodic basis to continue to improve accuracy and performance of the classification computer model on the latest searches and retrieved items.

Figure 3A:
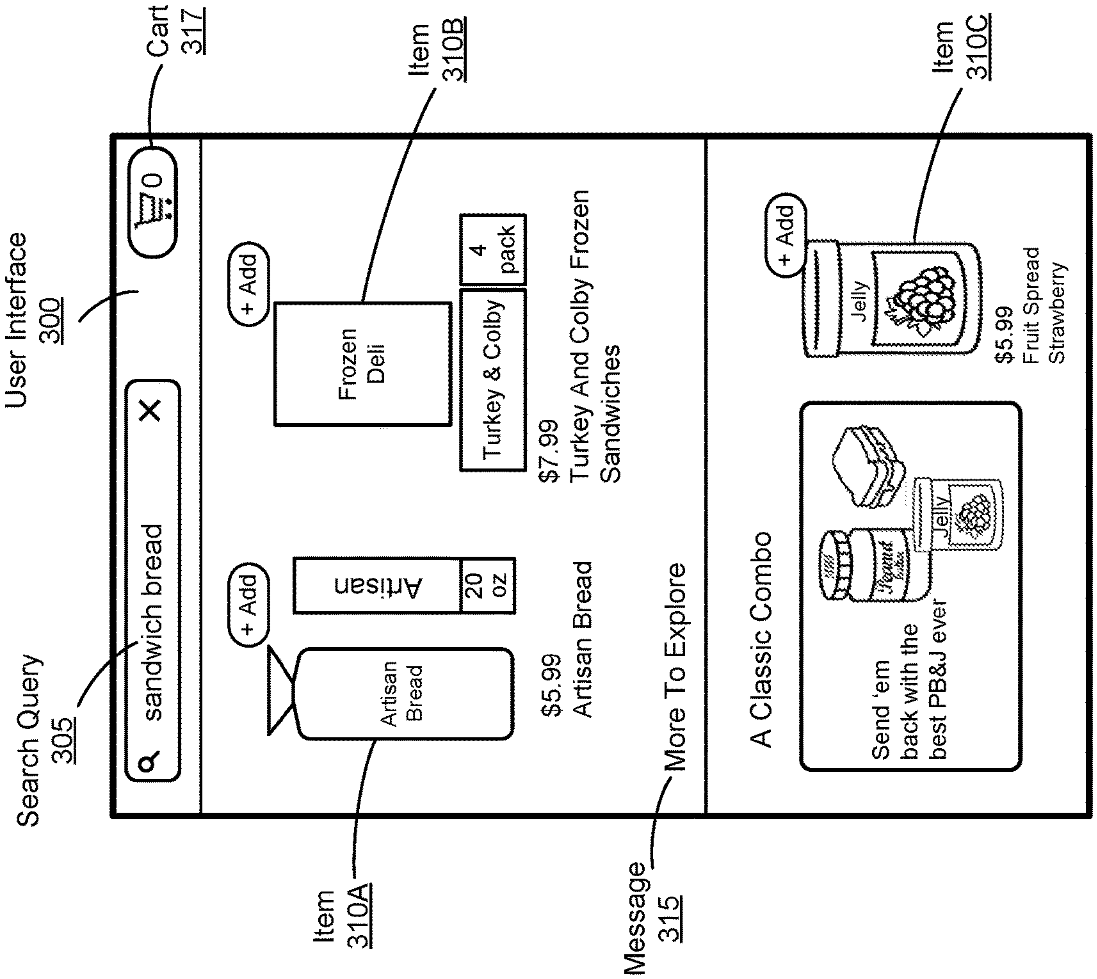
FIG. 3A illustrates an example user interface with classified results of a search query made by a user of an online concierge system displayed at a user client device, in accordance with one or more embodiments.

FIG. 3A illustrates an example user interface 300 with classified results of a search query 305 made by a user of the online concierge system 140 displayed at the user client device 100, in accordance with one or more embodiments. The content presentation module 210 may cause the user client device 100 to display the user interface 300 in response to the search query 305, "sandwich bread." The content presentation module 210 causes the user client device 100 to display the user interface 300 with an item 310A that was classified (e.g., by the classification computer model) as the "Exact Match" type of relevance (or class) to the search query 305. Additionally, the content presentation module 210 causes the user client device 100 to display the user interface 300 with an item 310B that was classified (e.g., by the classification computer model) as, e.g., the "Weak Substitute" type of relevance to the search query 305. Furthermore, the content presentation module 210 causes the user client device 100 to display the user interface 300 with an item 310C that was classified (e.g., by the classification computer model) as, e.g., the "Close Complement" type of relevance to the search query 305. In order to appropriately label the item 310C for the user, the content presentation module 210 causes the user client device 100 to display the user interface 300 with a message 315, "More To Explore" (e.g., generated by the ranking and filtering module 270 or the content presentation module 210), indicating to the user that the item 310C is a complementary item that may be of interest to the user. The user may utilize the user interface 300 to add any of the recommended items 310A, 310B, 310C into a cart 317.

Note that the separation of "Close Complement" versus "Remote Complement" and "Strong Substitute" versus "Weak Substitute" is also designed to increase potential ads coverage and/or sales while ensuring pleasant user experience. For example, in the top block sponsored ads and display ads of a user interface of the user client device 100, the content presentation module 210 may only display "Exact Match" items and/or "Strong Substitute" items. In the middle page of the user interface, the content presentation module 210 may show ads that are "Close Complement" to the search intent. And "Weak Substitute" and "Remote Complement" items may be displayed lower in the page of the user interface as these items are less frequently or commonly associated with the intended search, but could still appeal to some users who have a broader interest in exploring similar items (e.g., "Weak Substitutes" items) or inspire users to make other unplanned meal or replace/update current cooking wares (e.g., Remote Complement" items). The granularized categories can also allow the online concierge system 140 to dynamically adjust ads presentation based upon the number of items in each category.

Figure 3B:
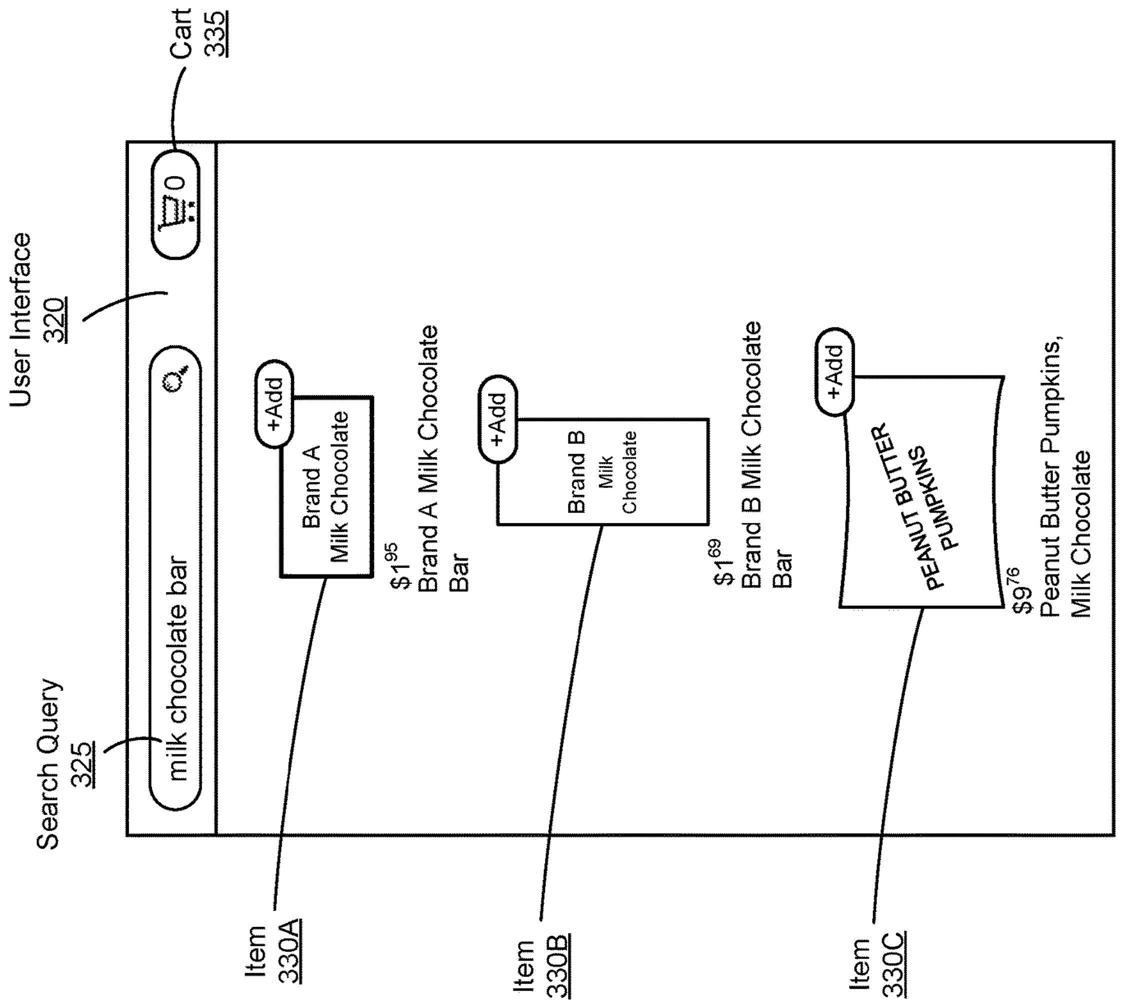
FIG. 3B illustrates another example user interface with classified results of a search query made by a user of an online concierge system displayed at a user client device, in accordance with one or more embodiments.

FIG. 3B illustrates an example user interface 320 with classified results of a search query 325 made by a user of the online concierge system 140 displayed at the user client device 100, in accordance with one or more embodiments. The content presentation module 210 may cause the user client device 100 to display the user interface 300 in response to the search query 325, "brand A milk chocolate bar." The content presentation module 210 causes the user client device 100 to display, at the top block of sponsored items (or ads) of the user interface 320, an item 330A (e.g., "Brand A Milk Chocolate Bar") labeled by the classification computer model as the "Exact Match" because the item 330A exactly matches an item intended by the search query 325.

The content presentation module 210 further causes the user client device 100 to display, at the middle block of sponsored items of the user interface 320, an item 330B (e.g., "Brand B Milk Chocolate Bar") labeled by the classification computer model as the "Strong Substitute" because the item 330B is of the same type as the intended item but from a different brand. The content presentation module 210 further causes the user client device 100 to display, at lower positions in the recommendation page of the user interface 320, an item 330C (e.g., "Peanut Butter Pumpkins, Milk Chocolate, Snack Size, Jambo Bag") labeled by the classification computer model as the "Weak Substitute" because the item 330C is of a different brand, different flavor, and different form/size than the intended item. However, the item 330C has a milk chocolate cover and could be of interest to some users to serve the broader milk chocolate intent. The content presentation module 210 does not display at the user interface 320 one or more items labeled by the classification computer model as "Irrelevant." For example, the "Brand A Syrup, Genuine Chocolate Flavor, Fat Free" item is labeled by the classification computer model as "Irrelevant" because this item, although belongs to the same brand as the intended item, is a different product (chocolate bar vs. chocolate flavor syrup). This "Irrelevant" item is filtered out by the ranking and filtering module 270 and it is not shown at the recommendation page of the user interface 320. The user may utilize the user interface 320 to add any of the recommended items 330A, 330B, 330C into a cart 335.

Figure 4:
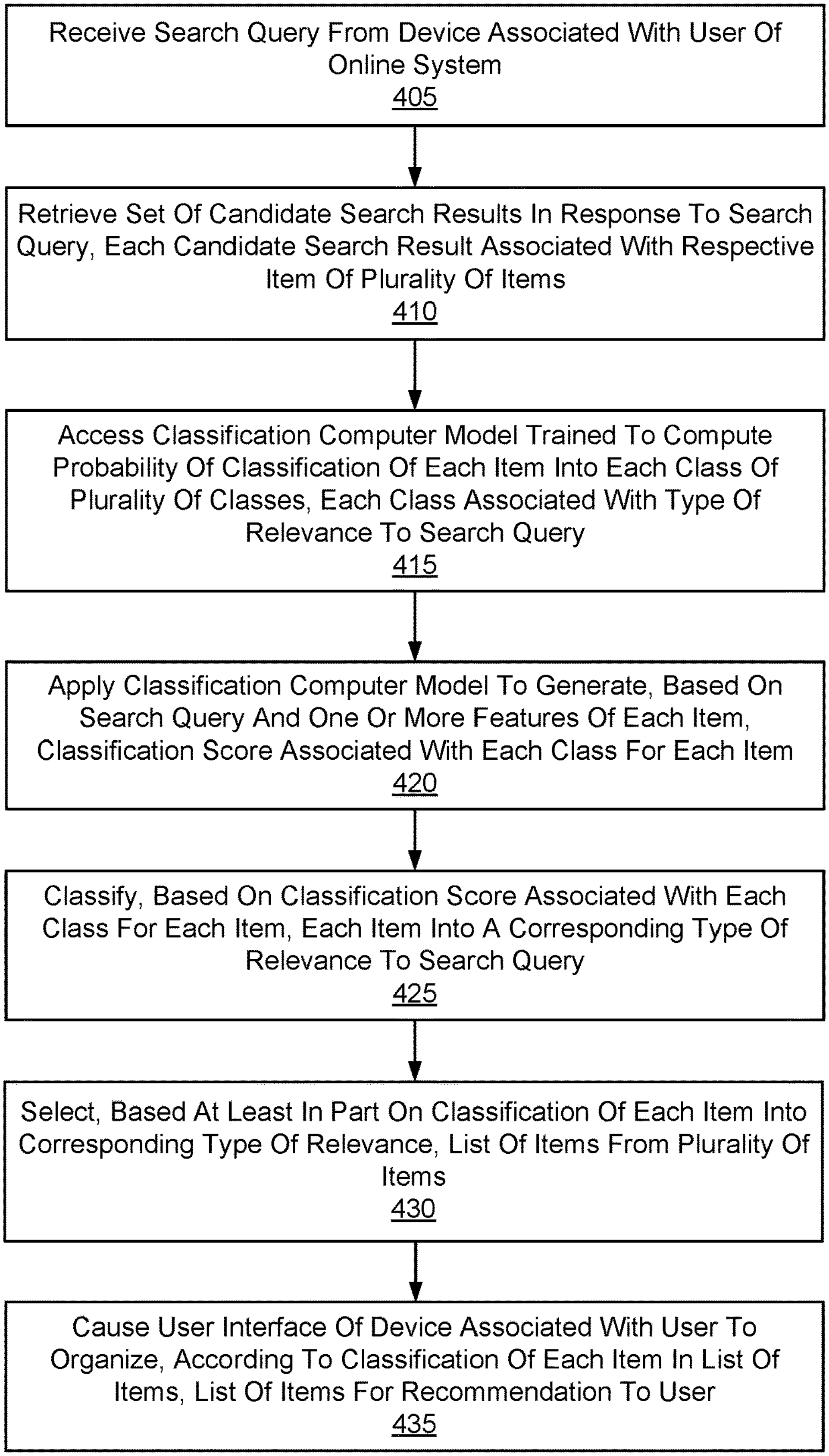
FIG. 4 is a flowchart for a method of using a trained computer model to classify results of a search query for recommendation to a user of an online concierge system, in accordance with one or more embodiments.

FIG. 4 is a flowchart for a method of using a trained computer model to classify results of a search query for recommendation to a user of an online concierge system, in accordance with one or more embodiments. Alternative embodiments may include more, fewer, or different steps from those illustrated in FIG. 4, and the steps may be performed in a different order from that illustrated in FIG. 4. These steps may be performed by an online concierge system (e.g., the online concierge system 140). Additionally, each of these steps may be performed automatically by the online concierge system without human intervention.

The online concierge system 140 receives 405 (e.g., at the search query module 250) a search query from a device associated with a user of the online concierge system 140 (e.g., the user client device 100). The online concierge system 140 retrieves 410 (e.g., from the data store 240 via the search query module 250) a set of candidate search results in response to the search query, each candidate search result in the set of candidate search results associated with a respective item of a plurality of items.

The online concierge system 140 accesses 415 a classification computer model of the online concierge system 140 (e.g., via the classification module 260) trained to compute a probability of classification of each of the plurality of items into each class of a plurality of classes, each class associated with a type of relevance to the search query. The online concierge system 140 applies 420 the classification computer model (e.g., via the classification module 260) to generate, based at least in part on the search query and one or more features of each of the plurality of items, a classification score associated with each of the plurality of classes for each of the plurality of items, wherein the classification score may be indicative of the probability of classification. The online concierge system 140 classifies 425 (e.g., via the classification module 260), based on the classification score associated with each of the plurality of classes for each of the plurality of items, each of the plurality of items into a corresponding type of relevance to the search query of a plurality of relevance types.

The online concierge system 140 may apply the classification computer model (e.g., via the classification module 260) to generate, based at least in part on the search query and the one or more features of each of the plurality of items, a first embedding for the search query and a second embedding for each of the plurality of items. The online concierge system 140 may apply the classification computer model (e.g., via the classification module 260) to compute, based at least in part on the first and second embeddings, the probability of classification of each of the plurality of items into each of the plurality of classes.

The online concierge system 140 may apply the classification computer model (e.g., via the classification module 260) to generate, based at least in part on the first and second embeddings, for each of the plurality of items, a plurality of classification outputs each associated with a respective class of the plurality of classes. The online concierge system 140 may apply the classification computer model (e.g., via the classification module 260) to compute the probability of classification of each of the plurality of items into each of the plurality of classes by applying a defined function (e.g., the SoftMax function) to the plurality of classification outputs.

The online concierge system 140 may generate (e.g., via the machine-learning training module 230) training data including pairs of a search query text and a product description text obtained from engagement data associated with a plurality of users of the online concierge system 140. The online concierge system 140 may train (e.g., via the machine-learning training module 230) the classification computer model using the generated training data.

The online concierge system 140 may obtain (e.g., via the machine-learning training module 230) data that include pairs of search queries and items. The online concierge system 140 may generate (e.g., via the machine-learning training module 230) training data based on evaluation of the pairs of search queries and items by a plurality of users of the online system using the plurality of classes. The online concierge system 140 may train (e.g., via the machine-learning training module 230) the classification computer model using the generated training data.

The online concierge system 140 selects 430 (e.g., via the ranking and filtering module 270), based at least in part on the classification of each of the plurality of items into the corresponding type of relevance, a list of items (e.g., one or more items) from the plurality of items. The online concierge system 140 may select the list of items by filtering out (e.g., via the ranking and filtering module 270) a subset of items from the plurality of items, each item in the subset of items being categorized into a subset of relevance types of the plurality of relevance types. The online concierge system 140 causes 435 (e.g., via the content presentation module 210) a user interface of the device associated with the user to organize, according to the classification of each item in the list of items, the list of items for recommendation to the user and inclusion into a cart.

The online concierge system 140 may rank (e.g., via the ranking and filtering module 270), based at least in part on the corresponding type of relevance to the search query associated with each item in the list of items, each item in the list of items. The online concierge system 140 may determine (e.g., via the ranking and filtering module 270), based at least in part on the ranking, a displaying order for each item in the list of items. The online concierge system 140 may cause (e.g., via the content presentation module 210) the device associated with the user to display the user interface with the list of items such that each item in the list of items is displayed in the determined displaying order.

The online concierge system 140 may access an engagement prediction computer model of the online concierge system 140 (e.g., via the ranking and filtering module 270) trained to compute a probability of engagement by the user for each item in a group of items from the list of items, the group of items associated with a same type of relevance to the search query. The online concierge system 140 may apply the engagement prediction computer model (e.g., via the ranking and filtering module 270) to generate, based at least in part on information about engagement of the user in relation to each item in the group, a ranking score for each item in the group. The ranking score may be indicative of the probability of engagement by the user for each item in the group of items. The online concierge system 140 may determine (e.g., via the ranking and filtering module 270), based at least in part on the ranking score for each item in the group, a displaying order for each item in the group. The online concierge system 140 may cause (e.g., via the content presentation module 210) the device associated with the user to display the user interface with the list of items including the group of items such that each item in the group of items is displayed in the determined displaying order.

The online concierge system 140 may collect (e.g., via the machine-learning training module 230) feedback data with information about a conversion by the user of each item in the list of items. The online concierge system 140 may re-train the classification computer model by updating (e.g., via the machine-learning training module 230), based at least in part on the collected feedback data, the set of parameters of the classification computer model.

The online concierge system 140 may collect (e.g., via the machine-learning training module 230) feedback data with one or more labels provided by the user, the one or more labels associated with one or more pairs of the search query and each item in the list of items. The online concierge system 140 may re-train the classification computer model by updating (e.g., via the machine-learning training module 230), based at least in part on the collected feedback data, the set of parameters of the classification computer model.

Embodiments of the present disclosure are directed to the online concierge system 140 that utilizes a trained classification computer model to classify items into types of relevance to a search query. The classify items are then grouped for displaying at a user interface of the user client device 100. In one or more embodiments, the engagement prediction computer model is utilized to rank and arrange items within each relevance class. The granularized query-item evaluation framework of the online concierge system 140 categorizes the relationship between a search query issued by a user of the online concierge system 140 and a set of recommended items into more explainable classes that are relatively intuitive and easy to interpret. The granularized query-item evaluation framework presented herein also provides a more accurate way of identifying and filtering irrelevant search results for different use cases. For example, complement items were previously considered as irrelevant for both search and ads, but with the framework presented herein, complement items could be considered as potential good ads candidates and presented in proper ads formats (e.g., sponsored ads, display ads, etc.) in the proper positions in the recommendation page (e.g., middle of the page) of the user interface. In this manner, a broader and more relevant ad coverage can be achieved, while the optimized ads can be represented in different forms and at different page layouts at the user interface.

ADDITIONAL CONSIDERATIONS

The foregoing description of the embodiments has been presented for the purpose of illustration; many modifications and variations are possible while remaining within the principles and teachings of the above description.

Any of the steps, operations, or processes described herein may be performed or implemented with one or more hardware or software modules, alone or in combination with other devices. In some embodiments, a software module is implemented with a computer program product comprising one or more computer-readable media storing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to a product that is produced by a computing process described herein. Such a product may store information resulting from a computing process, where the information is stored on a non-transitory, tangible computer-readable medium and may include a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. The training process may include: applying the machine-learning model to a training example, comparing an output of the machine-learning model to the label associated with the training example, and updating weights associated for the machine-learning model through a back-propagation process. The weights may be stored on one or more computer-readable media, and are used by a system when applying the machine-learning model to new data.

The language used in the specification has been principally selected for readability and instructional purposes, and it may not have been selected to narrow the inventive subject matter. It is therefore intended that the scope of the patent rights be limited not by this detailed description, but rather by any claims that issue on an application based hereon.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or." For example, a condition "A or B" is satisfied by any one of the following: A is true (or present) and B is false (or not present); A is false (or not present) and B is true (or present); and both A and B are true (or present). Similarly, a condition "A, B, or C" is satisfied by any combination of A, B, and C being true (or present). As a not-limiting example, the condition "A, B, or C" is satisfied when A and B are true (or present) and C is false (or not present). Similarly, as another not-limiting example, the condition "A, B, or C" is satisfied when A is true (or present) and B and C are false (or not present).

What is claimed is:

1. A method, performed at a computer system comprising a processor and a computer-readable medium, comprising:

receiving, via a network, a search query from a device associated with a user of the computer system;

retrieving, from a database of the computer system and using the search query, a set of candidate search results, each candidate search result in the set of candidate search results associated with a respective item of a plurality of items;

accessing a classification model of the computer system, wherein the classification model is a machine-learning model trained to compute a probability of classification of each of the plurality of items into each class of a plurality of classes, each class associated with a respective type of relevance to the search query of a plurality of relevance types;

applying the classification model to the search query and one or more features of each of the plurality of items to generate a classification score associated with each of the plurality of classes for each of the plurality of items, the classification score being indicative of the probability of classification, wherein the classification model is a two-tower transformer encoder, and applying the classification model comprises:

applying a first tower of the two-tower transformer encoder to the search query to generate a query embedding representing characteristics of the search query, applying a second tower of the two-tower transformer encoder to the one or more features of each of the plurality of items to generate an item embedding describing each of the plurality of items, applying a multilayer perceptron neural network head of the two-tower transformer encoder to the query embedding and the item embedding to generate a set of classification outputs for each of the plurality of items, each classification output in the set of classification outputs associated with a respective class of the plurality of classes, and applying a predetermined function of the multilayer perceptron neural network head to the set of classification outputs to generate the classification score associated with each of the plurality of classes for each of the plurality of items;

classifying, using the classification score associated with each of the plurality of classes for each of the plurality of items, each of the plurality of items into a corresponding type of relevance to the search query of the plurality of relevance types;

selecting, using the classification of each of the plurality of items into the corresponding type of relevance, a list of items from the plurality of items; and causing a user interface of the device associated with the user to organize, according to the classification of each item in the list of items, the list of items for recommendation to the user and inclusion into a cart.

2. The method of claim 1, further comprising:

generating training data including pairs of a search query text and a product description text obtained from engagement data associated with a plurality of users of the computer system; and training the classification model using the generated training data.

3. The method of claim 1, further comprising:

obtaining data that include pairs of search queries and items;

generating training data based on evaluation of the pairs of search queries and items by a plurality of users of the computer system using the plurality of classes; and training the classification model using the generated training data.

4. The method of claim 1, further comprising:

collecting feedback data with information about a conversion by the user of each item in the list of items; and re-training the classification model by updating, using the collected feedback data, a set of parameters of the classification model.

5. The method of claim 1, further comprising:

collecting feedback data with one or more labels provided by the user, the one or more labels associated with one or more pairs of the search query and each item in the list of items; and re-training the classification model by updating, using the collected feedback data, a set of parameters of the classification model.

6. The method of claim 1, wherein selecting the list of items from the plurality of items comprises:

filtering out a subset of items from the plurality of items, each item in the subset of items being classified into a subset of relevance types of the plurality of relevance types.

7. The method of claim 1, wherein causing the user interface to organize the list of items comprises:

ranking, using the corresponding type of relevance to the search query associated with each item in the list of items, each item in the list of items;

determining, in accordance with the ranking, a displaying order for each item in the list of items; and causing the device associated with the user to display the user interface with the list of items, each item in the list of items displayed in the determined displaying order.

8. The method of claim 1, causing the user interface to organize the list of items comprises:

accessing an engagement prediction model of the computer system, wherein the engagement prediction model is a machine-learning model trained to compute a probability of engagement by the user for each item in a group of items from the list of items, the group of items associated with a same type of relevance to the search query;

applying the engagement prediction model to information about engagement of the user in relation to each item in the group of items to generate a ranking score for each item in the group of items, wherein the ranking score is indicative of the probability of engagement;

determining, using the ranking score for each item in the group of items, a displaying order for each item in the group of items; and causing the device associated with the user to display the user interface with the list of items including the group of items, each item in the group of items displayed in the determined displaying order.

9. A computer program product comprising a non-transitory computer readable storage medium having instructions encoded thereon that, when executed by a processor, cause the processor to perform steps comprising:

receiving, via a network, a search query from a device associated with a user of a computer system;

retrieving, from a database of the computer system and using the search query, a set of candidate search results, each candidate search result in the set of candidate search results associated with a respective item of a plurality of items;

accessing a classification model of the computer system, wherein the classification model is a machine-learning model trained to compute a probability of classification of each of the plurality of items into each class of a plurality of classes, each class associated with a respective type of relevance to the search query of a plurality of relevance types;

applying the classification model to the search query and one or more features of each of the plurality of items to generate a classification score associated with each of the plurality of classes for each of the plurality of items, the classification score being indicative of the probability of classification, wherein the classification model is a two-tower transformer encoder, and applying the classification model comprises:

applying a first tower of the two-tower transformer encoder to the search query to generate a query embedding representing characteristics of the search query, applying a second tower of the two-tower transformer encoder to the one or more features of each of the plurality of items to generate an item embedding describing each of the plurality of items, applying a multilayer perceptron neural network head of the two-tower transformer encoder to the query embedding and the item embedding to generate a set of classification outputs for each of the plurality of items, each classification output in the set of classification outputs associated with a respective class of the plurality of classes, and applying a predetermined function of the multilayer perceptron neural network head to the set of classification outputs to generate the classification score associated with each of the plurality of classes for each of the plurality of items;

classifying, using the classification score associated with each of the plurality of classes for each of the plurality of items, each of the plurality of items into a corresponding type of relevance to the search query of the plurality of relevance types;

selecting, using the classification of each of the plurality of items into the corresponding type of relevance, a list of items from the plurality of items; and causing a user interface of the device associated with the user to organize, according to the classification of each item in the list of items, the list of items for recommendation to the user and inclusion into a cart.

10. The computer program product of claim 9, wherein the instructions further cause the processor to perform steps comprising:

generating training data including pairs of a search query text and a product description text obtained from engagement data associated with a plurality of users of the computer system; and training the classification model using the generated training data.

11. The computer program product of claim 9, wherein the instructions further cause the processor to perform steps comprising:

obtaining data that include pairs of search queries and items;

generating training data based on evaluation of the pairs of search queries and items by a plurality of users of the computer system using the plurality of classes; and training the classification model using the generated training data.

12. The computer program product of claim 9, wherein the instructions further cause the processor to perform steps comprising:

collecting feedback data with information about a conversion by the user of each item in the list of items; and re-training the classification model by updating, using the collected feedback data, a set of parameters of the classification model.

13. The computer program product of claim 9, wherein the instructions further cause the processor to perform steps comprising:

collecting feedback data with one or more labels provided by the user, the one or more labels associated with one or more pairs of the search query and each item in the list of items; and re-training the classification model by updating, using the collected feedback data, a set of parameters of the classification model.

14. The computer program product of claim 9, wherein the instructions further cause the processor to perform steps comprising:

selecting the list of items from the plurality of items by filtering out a subset of items from the plurality of items, each item in the subset of items being classified into a subset of relevance types of the plurality of relevance types.

15. The computer program product of claim 9, wherein the instructions further cause the processor to perform steps comprising:

accessing an engagement prediction model of the computer system, wherein the engagement prediction model is a machine-learning model trained to compute a probability of engagement by the user for each item in a group of items from the list of items, the group of items associated with a same type of relevance to the search query;

applying the engagement prediction model to information about engagement of the user in relation to each item in the group of items to generate a ranking score for each item in the group of items, wherein the ranking score is indicative of the probability of engagement;

determining, using the ranking score for each item in the group of items, a displaying order for each item in the group of items; and causing the device associated with the user to display the user interface with the list of items including the group of items, each item in the group of items displayed in the determined displaying order.

16. A computer system comprising:

a processor; and a non-transitory computer-readable storage medium having instructions that, when executed by the processor, cause the computer system to perform steps comprising:

receiving, via a network, a search query from a device associated with a user of the computer system;

retrieving, from a database of the computer system and using the search query, a set of candidate search results, each candidate search result in the set of candidate search results associated with a respective item of a plurality of items;

accessing a classification model of the computer system, wherein the classification model is a machine-learning model trained to compute a probability of classification of each of the plurality of items into each class of a plurality of classes, each class associated with a respective type of relevance to the search query of a plurality of relevance types;

applying the classification model to the search query and one or more features of each of the plurality of items to generate a classification score associated with each of the plurality of classes for each of the plurality of items, the classification score being indicative of the probability of classification, wherein the classification model is a two-tower transformer encoder, and applying the classification model comprises:

applying a first tower of the two-tower transformer encoder to the search query to generate a query embedding representing characteristics of the search query, applying a second tower of the two-tower transformer encoder to the one or more features of each of the plurality of items to generate an item embedding describing each of the plurality of items, applying a multilayer perceptron neural network head of the two-tower transformer encoder to the query embedding and the item embedding to generate a set of classification outputs for each of the plurality of items, each classification output in the set of classification outputs associated with a respective class of the plurality of classes, and applying a predetermined function of the multilayer perceptron neural network head to the set of classification outputs to generate the classification score associated with each of the plurality of classes for each of the plurality of items;

classifying, using the classification score associated with each of the plurality of classes for each of the plurality of items, each of the plurality of items into a corresponding type of relevance to the search query of the plurality of relevance types;

selecting, using the classification of each of the plurality of items into the corresponding type of relevance, a list of items from the plurality of items; and causing a user interface of the device associated with the user to organize, according to the classification of each item in the list of items, the list of items for recommendation to the user and inclusion into a cart.

* * * * *